United States Patent

(12) United States Patent
Ito et al.

(10) Patent No.: US 8,340,859 B2
(45) Date of Patent: Dec. 25, 2012

(54) SHIFT-BY-WIRE SYSTEM

(75) Inventors: Yoshinobu Ito, Anjo (JP); Tomohiro Aritake, Anjo (JP)

(73) Assignee: Aisin AW Co., Ltd., Anjo-shi, Aichi-ken (JP)

( * ) Notice: Subject to any disclaimer, the term of this patent is extended or adjusted under 35 U.S.C. 154(b) by 379 days.

(21) Appl. No.: 12/691,081

(22) Filed: Jan. 21, 2010

(65) Prior Publication Data
US 2010/0250055 A1  Sep. 30, 2010

(30) Foreign Application Priority Data
Mar. 24, 2009 (JP) .................. 2009-072065

(51) Int. Cl.
G01M 17/00 (2006.01)
G06F 7/00 (2006.01)
G06F 11/00 (2006.01)
G07C 5/00 (2006.01)
G05D 1/00 (2006.01)

(52) U.S. Cl. .......... 701/29.7; 701/1; 701/29.1; 701/29.2

(58) Field of Classification Search .................... 701/34, 701/1, 29.1, 29.2, 29.7
See application file for complete search history.

(56) References Cited

U.S. PATENT DOCUMENTS 6,230,576 B1 * 5/2001 Yamada et al. ............ 74/335
8,035,934 B2 * 10/2011 Inoue et al. ............ 361/31
2004/0261559 A1 * 12/2004 Ozaki et al. ............ 74/473.12
2009/0091866 A1 * 4/2009 Inoue et al. ............ 361/23

FOREIGN PATENT DOCUMENTS

| JP | 2003-166641 | 6/2003 |
| JP | 2004-125061 | 4/2004 |
| JP | 2006-336710 | 12/2006 |
| JP | 2007-139102 | 6/2007 |
| JP | 2007-151266 | 6/2007 |

* cited by examiner

*Primary Examiner* — James Trammell
*Assistant Examiner* — Daniel L Greene
(74) *Attorney, Agent, or Firm* — Bacon & Thomas, PLLC

(57) ABSTRACT

A shift-by-wire system, connected to a manual shaft in a vehicle, includes: an electric motor having a rotary shaft which rotates the manual shaft; an angle-of-rotation sensor that detects angle position of the rotary shaft for control of the electric motor; a shaft position sensor that detects angular position of the manual shaft; and a control unit that, when the angle-of-rotation sensor functions normally, controls the electric motor according to the sensed angular position of the rotary shaft, so that the sensed angular position of the shaft comes within a predetermined range, and when the angle-of-rotation sensor does not function normally, initiates sensor-less control of the electric motor while estimating the direction of rotation of the rotation shaft, based on the sensed angular position of the shaft, and ceases sensor-less control when the sensed angular position is within the predetermined range.

6 Claims, 11 Drawing Sheets

FIG.2

| | C-1 | C-2 | C-3 | B-1 | B-2 | F-1 |
|---|---|---|---|---|---|---|
| P | | | | | | |
| REV | | | O | | O | |
| N | | | | | | |
| D 1st | O | | | | (O) | O |
| D 2nd | O | | | O | | |
| D 3rd | O | | O | | | |
| D 4th | O | O | | | | |
| D 5th | | O | O | | | |
| D 6th | | O | | O | | |

FOR SP=P

FOR SP ≠ P

SHIFT-BY-WIRE SYSTEM

CROSS-REFERENCE

Japanese Patent Application No. 2009-072065 filed on Mar. 24, 2009 including the specification, drawings and abstract is incorporated herein by reference in its entirety.

BACKGROUND OF THE INVENTION

1. Field of the Invention

The present invention relates to a shift-by-wire system that is mounted in a vehicle and that actuates an object of actuation by driving a manual shaft on the basis of a shifting manipulation.

2. Description of the Related Art

In the past, as this type of shift-by-wire system, a shift-by-wire system that includes a spool position sensor which detects the position of a spool to be used to switch shift positions, and that when any of a parking (P) position, a reverse (R) position, an neutral (N) position, and a drive (D) position is selected using a selector switch (shift switch), controls a motor so that the spool will be located at a position associated with the selected position on the basis of a signal sent from the spool position sensor has been proposed (refer to, for example, JP-A-2007-139102 (patent document 1)). In this system, position switching edges are associated with the D position and P position respectively, and a regulation unit (stopper) is included to regulate the rotation of the motor at the position switching edges. When an abnormality occurs in the position sensor, if the selector switch is set to the D position, the motor is driven until a movement is regulated to a D-position direction. If the selector switch is not set to the D position, the motor is driven until a movement is regulated to a P-position direction (a reverse rotating direction with respect to the D-position direction). Thus, the abnormality in the spool position sensor is coped with.

As for the foregoing shift-by-wire system, a description has been made of a countermeasure to be taken when an abnormality occurs in the spool position sensor but has not been made of a case where an abnormality occurs in a motor angle sensor to be used to control a brushless motor which drives the spool. When an abnormality occurs in the motor angle sensor, driving the motor is thought to be ceased. However, when consideration is taken into the fact that the shift-by-wire system is mounted in a vehicle, it is desired that even if an abnormality occurs in the motor angle sensor, evacuative driving is enabled or any other appropriate measure is taken.

SUMMARY OF THE INVENTION

A principal object of a shift-by-wire system in accordance with the present invention is to more appropriately cope with an abnormality in an angle-of-rotation sensor to be used to control an electric motor that actuates an object of actuation.

In order to accomplish the above principal object, the shift-by-wire system in accordance with the present invention adopts pieces of measure presented below.

The shift-by-wire system in accordance with the present invention is a shift-by-wire system that is mounted in a vehicle and that actuates an object of actuation by driving a manual shaft on the basis of a shifting manipulation, and includes:

an electric motor that includes a rotation shaft and rotates or drives the manual shaft by rotating or driving the rotation shaft;

an angle-of-rotation sensor that detects the angle of rotation of the rotation shaft for the purpose of controlling the electric motor;

a shaft position sensor that detects the rotational position of the manual shaft; and a control unit that at an ordinary time at which the angle-of-rotation sensor normally functions, implements ordinary-time control to control the electric motor on the basis of the angle of rotation of the rotation shaft, which is sent from the angle-of-rotation sensor, so that the rotational position of the shaft sent from a shift position sensor will square with a target rotational position within a predetermined range, and that at an unordinary time at which the angle-of-rotation sensor does not normally function, implements unordinary-time control to initiate sensor-less control for controlling the electric motor while estimating the rotating direction of the rotation shaft of the electric motor on the basis of the rotational position of the shaft sent from the shift position sensor, and to cease the sensor-less control when the rotational position sent from the shift position sensor squares with the target rotational position within the predetermined range.

In the shift-by-wire system according to the present invention, at the ordinary time at which the angle-of-rotation sensor that detects the angle of rotation of the rotation shaft of the electric motor which rotates or drives the manual shaft functions normally, ordinary-time control is implemented to control the electric motor on the basis of the angle of rotation of the rotation shaft, which is sent from the angle-of-rotation sensor, so that the rotational position of the shaft sent from the shift position sensor which detects the rotational position of the manual shaft will square with the target rotational position within the predetermined range. At the unordinary time at which the angle-of-rotation sensor does not normally function, unordinary-time control is implemented to initiate sensor-less control for controlling the electric motor while estimating the rotating direction of the rotation shaft of the electric motor on the basis of the rotational position of the shaft sent from the shift position sensor, and to cease the sensor-less control when the rotational position sent from the shift position sensor squares with the target rotational position within the predetermined range. Therefore, even at the unordinary time at which the angle-of-rotation sensor does not normally function, the rotational position of the manual shaft can be squared with the target rotational position within the predetermined range in order to actuate an object of actuation. As a result, an abnormality in the angle-of-rotation sensor can be more appropriately coped with.

In the shift-by-wire system according to the present invention, the electric motor may be a three-phase synchronous motor. The angle-of-rotation sensor may include three elements, which are associated with the phases, so as to detect the angle of rotation of a rotor included in the motor. The control unit may be such a mechanism that: when an abnormality occurs in the angle-of-rotation sensor, if the abnormality involves one of the three elements, recognizes the ordinary time, estimates the rotating direction of the electric motor on the basis of the rotational position of the shaft sent from the shaft position sensor, and implements the ordinary-time control on the basis of the estimated rotating direction and signals sent from the two normal elements; and when the abnormality involves two or more out of the three elements, recognizes the unordinary time and implements the unordinary-time control. In this case, even when an abnormality occurs in one of the three elements included in the angle-of-rotation sensor, the same control as the one at the ordinary time can be implemented.

In the shift-by-wire system according to the present invention, the control unit may be a mechanism configured to control the electric motor so that at the unordinary time, the rotational position of the shaft will be shifted to the target rotational position at a rotating speed lower than the rotating speed attained at the ordinary time. In this case, at the unordinary time, the rotational position of the shaft can be more reliably shifted to the target rotational position.

In the shift-by-wire system according to the present invention, the vehicle may have an automatic transmission, which includes clutches that convey power fed from a power plant to an axle, mounted therein. The control unit may be a mechanism configured to control the clutches so that when a predetermined time has elapsed since initiation of the unordinary-time control, the control of the electric motor will be ceased in order to disconnect the power plant from the axle. In this case, even when the unordinary-time control is not normally implemented, unexpected power can be suppressed to be outputted to the axle.

Further, in the shift-by-wire system according to the present invention, the vehicle may have an automatic transmission, which includes clutches that are actuated with a fluid pressure fed via a manual valve interlocked with the manual shaft, mounted therein. The object of actuation may be the manual valve, or may be a parking lock mechanism that is actuated along with driving of the manual shaft.

BRIEF DESCRIPTION OF THE DRAWINGS

FIG. 2 is an explanatory diagram showing an actuation table for an automatic transmission;

DETAILED DESCRIPTION OF THE EMBODIMENTS

Next, the best mode for carrying out the invention will be described by taking an embodiment for instance.

Figure 1:
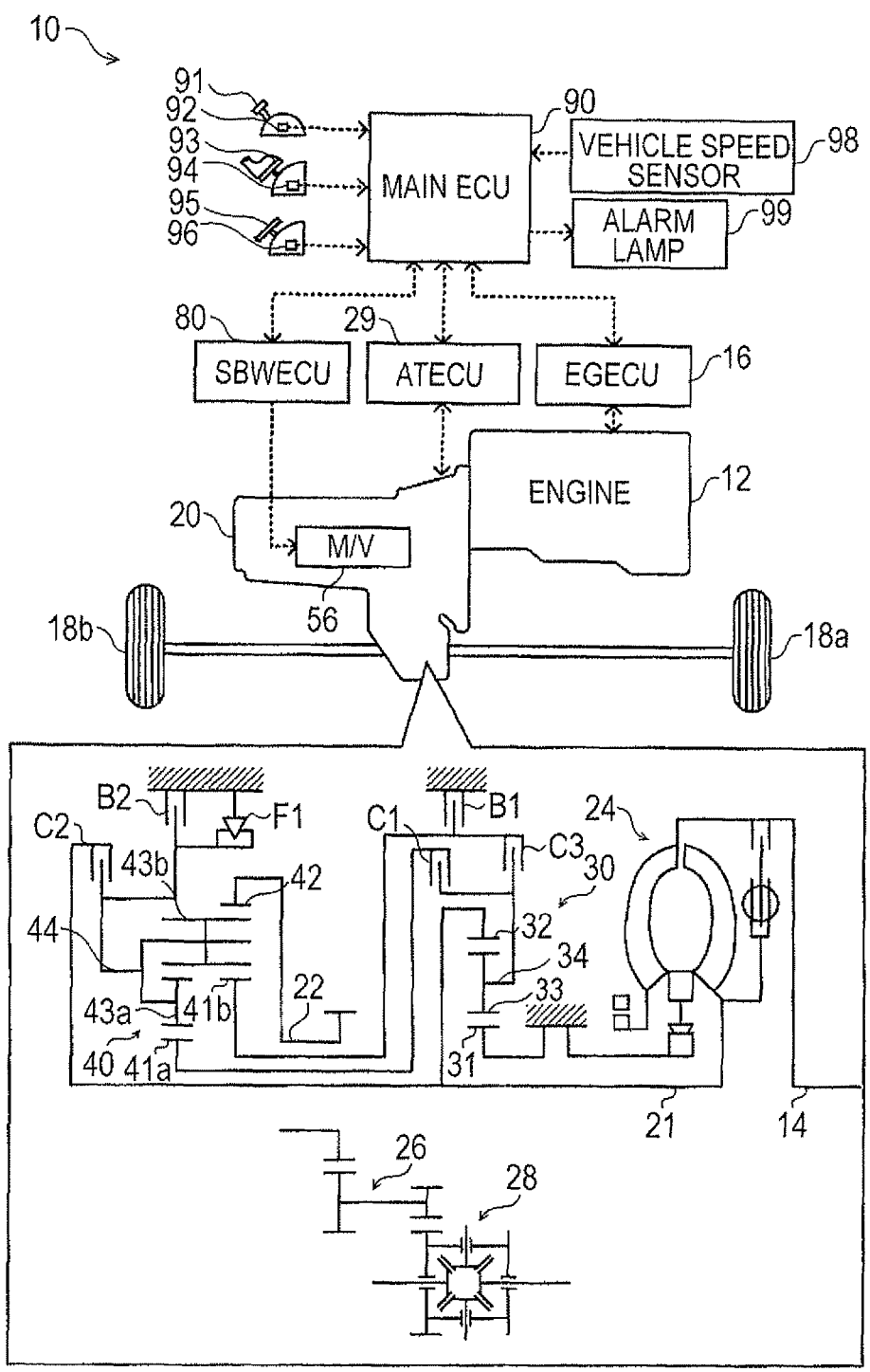
FIG. 1 is a configuration diagram showing the outline of the configuration of an automobile in which a shift-by-wire system that is an embodiment of the present invention is mounted.
Figure 3:
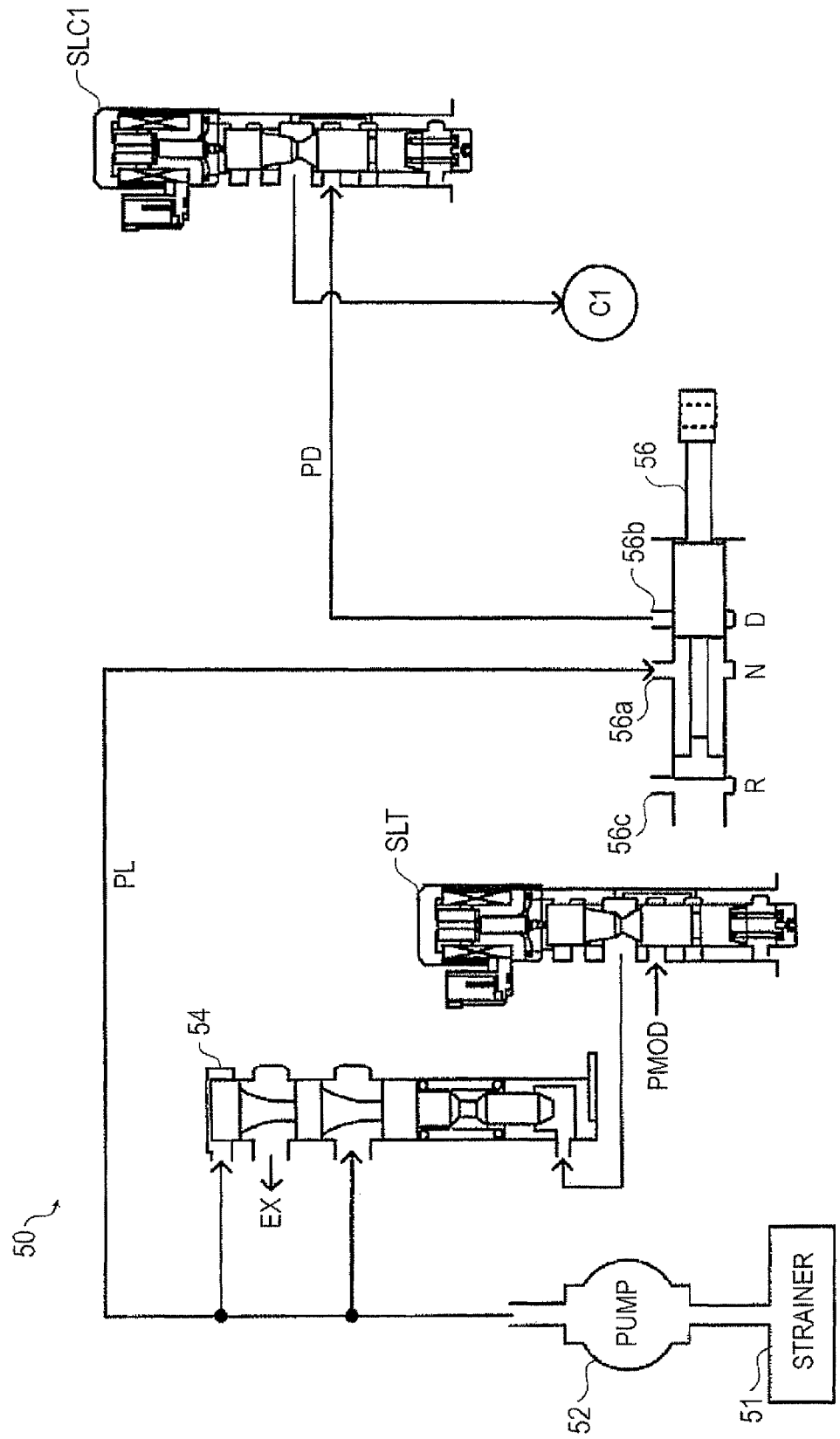
FIG. 3 is a configuration diagram showing the outline of the configuration of a hydraulic circuit.
Figure 4:
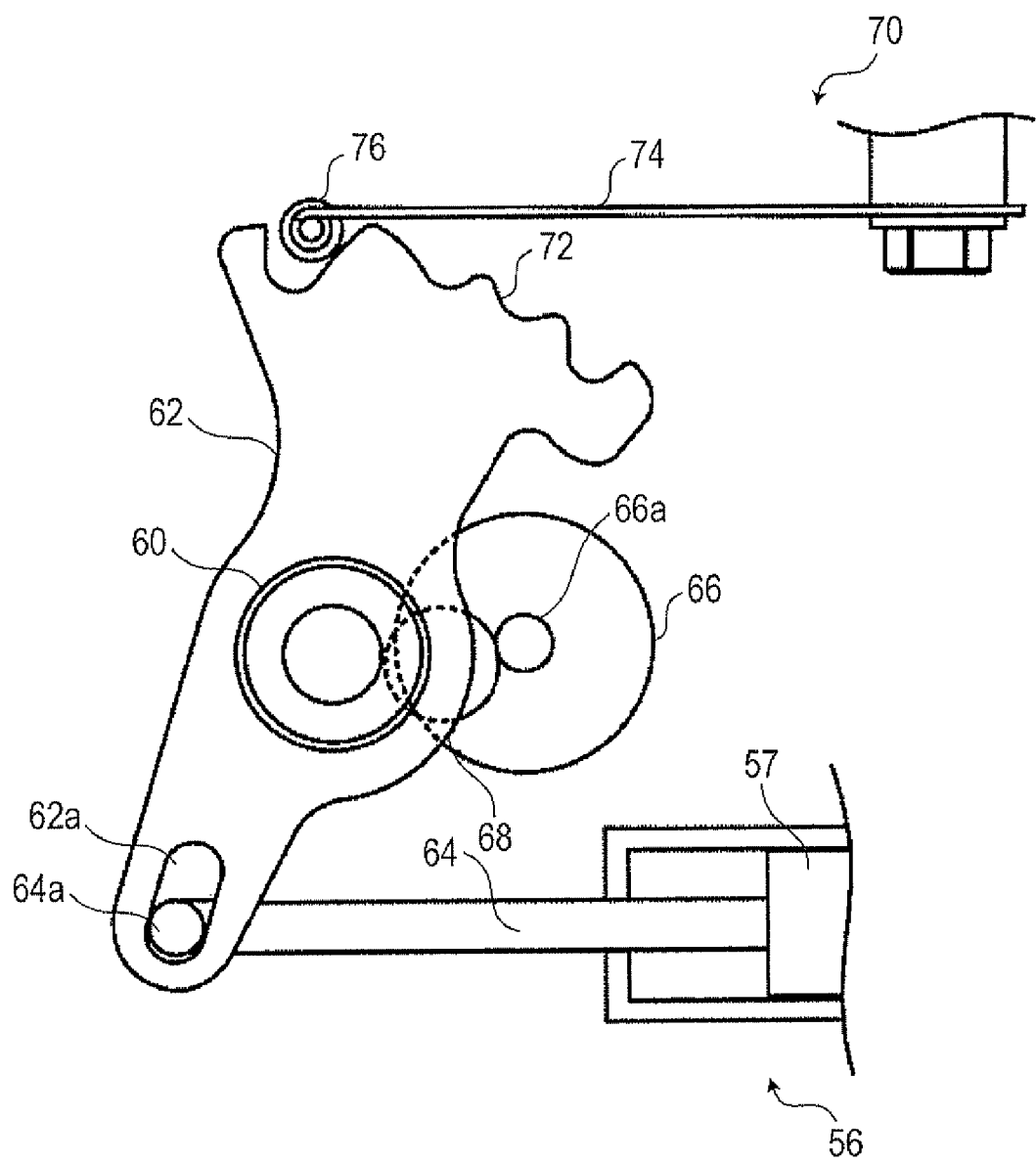
FIG. 4 is a construction diagram showing the outline of the construction of a driving system for a manual valve.

FIG. 1 is a configuration diagram showing the outline of the configuration of an automobile 10 in which a shift-by-wire system that is an embodiment of the present invention is mounted. FIG. 2 shows an actuation table for an automatic transmission 20. FIG. 3 is a configuration diagram showing the outline of the configuration of a hydraulic circuit 50. FIG. 4 is a construction diagram showing the outline of the construction of a driving system for a manual valve 56. The automobile 10 concerning the embodiment includes: as shown in FIG. 1, an engine 12 that is an internal combustion engine which outputs power through explosion and combustion of a hydrocarbon fuel such as gasoline or light oil; an engine electronic control unit (hereinafter, an engine ECU) 16 that operates or controls the engine 12; a lock-up clutch inclusive torque converter 24 attached to a crankshaft 14 of the engine 12; a stepped automatic transmission 20 that has an input shaft 21 thereof coupled to the output side of the torque converter 24, has an output shaft 22 thereof coupled to driving wheels 18a and 18b via a gear mechanism 26 and a differential gear 28, and changes gears to convey power inputted to the input shaft 21 to the output shaft 22; an automatic transmission electronic control unit (hereinafter, an ATECU) 29 that controls the automatic transmission 20 and a shift-by-wire system electronic control unit (hereinafter, a SBWECU) 80; and a main electronic control unit (hereinafter, a main ECU) 90 that controls the whole of the vehicle.

The automatic transmission 20 is, as shown in FIG. 1, constructed as a stepped transmission for changing six speed stages, and includes a single-pinion type planetary gear mechanism 30, a Ravigneaux type planetary gear mechanism 40, three clutches C1, C2, and C3, two brakes B1 and B2, and a one-way clutch F1. The single-pinion type planetary gear mechanism 30 includes a sun gear 31 serving as an external gear, a ring gear 32 serving as an internal gear disposed concentrically with the sun gear 31, plural pinion gears 33 that mesh with both the sun gear 31 and ring gear 32, and a carrier 34 that sustains the plural pinion gears 33 so that the pinion gears can rotate or revolve. The sun gear 31 is locked in a case, and the ring gear 32 is connected to the input shaft 21. The Ravigneaux type planetary gear mechanism 40 includes two sun gears 41a and 41b that are external gears, a ring gear 42 that is an internal gear, plural short pinion gears 43a that mesh with the sun gear 41a, plural long pinion gears 43b that mesh with both the sun gear 41b and plural short pinion gears 43a, and also mesh with the ring gear 42, and a carrier 44 that links the plural short pinion gears 43a and plural long pinion gears 43b, and sustains the pinion gears so that the pinion gears can rotate or revolute. The sun gear 41a is connected to the carrier 34 of the single-pinion type planetary gear mechanism 30 via the clutch C1. The sun gear 41b is connected to the carrier 34 via the clutch C3 and also connected to the case via the brake B1. The ring gear 42 is connected to the output shaft 22, and the carrier 44 is connected to the input shaft 21 via the clutch C2. The rotation of the carrier 44 can be freed or fixed according to the ON or OFF of the brake B2, and is regulated to one direction by the one-way clutch F1.

In the thus constructed automatic transmission 20, as seen from the actuation table of FIG. 2, the first to sixth speeds for advancement, reverse and neutral can be switched according to the combination of the ONs or OFFs (ON may be referred to as engagement, OFF may be referred to as disengagement, and the same applies to a description to be made below) of the clutches C1 to C3 and the ONs or OFFs of the brakes B1 and B2. As shown in FIG. 2, the state of the first speed for advancement is attained by bringing the clutch C1 to ON and the clutches C2 and C3 and brakes B1 and B2 to OFF (in the case of an engine brake, the brake B2 is brought to ON). The state of the second speed for advancement is attained by bringing the clutch C1 and brake B1 to ON and the clutches C2 and C3 and brake B2 to OFF. The state of the third speed for advancement is attained by bringing the clutches C1 and C3 to ON and the clutch C2 and brakes B1 and B2 to OFF. The state of the fourth speed for advancement is attained by bringing the clutches C1 and C2 to ON and the clutch C3 and brakes B1 and B2 to OFF. The state of the fifth speed for advancement is attained by bringing the clutches C2 and C3 to ON and the clutch C1 and brakes B1 and B2 to OFF. The state of the sixth speed for advancement is attained by bringing the clutch C2 and brake B1 to ON and the clutches C1 and C3 and brake B2 to OFF. The state of a reverse is attained by bringing the clutch C3 and brake B2 to ON and the clutches C1 and C2 and brake B1 to OFF. The state of a neutral is attained by bringing all the clutches C1 to C3 and brakes B1 and B2 to OFF.

The clutches C1 to C3 and brakes 81 and B2 of the automatic transmission 20 are driven by the hydraulic circuit 50. The hydraulic circuit 50 includes: as shown in FIG. 3, a mechanical oil pump 52 that sucks a working fluid from a strainer 51 using power fed from the engine 12, and feeds it with a pressure; a regulator valve 54 that adjusts the pressure of the working fluid (line pressure PL) fed from the mechanical oil pump 52 with a pressure; a linear solenoid SLT that drives the regulator valve 54 using a modulator pressure PMOD inputted via a modulator valve that is not shown and derived from the line pressure PL; a manual valve 56 including an input port 56a through which the line pressure PL is inputted, a D-position output port 56b, and an R-position output port 56c; and a linear solenoid SLC1 that inputs a drive pressure PD through the D-position output port 56b of the manual valve 56, adjusts it, and outputs it to the clutch C1. In the embodiment, the hydraulic systems for the clutches C2 and C3 other than the clutch C1 and for the brakes B1 and B2 are omitted. The hydraulic systems can be configured using known linear solenoids and others.

The manual valve 56 includes: as shown in FIG. 4, a manual plate 62 attached to a manual shaft 60; a spool 64 having a hook 64a, which is shaped like letter L and caught in an elongated hole 62a formed at a position (end) deflected from the axis of rotation of the manual shaft 60 in the manual plate 62, formed at the distal end thereof; and a land 57 formed on the spool 64. A rotational motion of the manual shaft 60 is converted into a linear motion of the spool 64 by driving an electric motor 66 whose rotation shaft 66a is connected to the manual shaft 60 via a reduction gear 68, whereby a state in which the communications of the input port 56a with the output ports 56b and 56c are interrupted, a state in which the input port 56a and D-position output port 56b are communicated with each other and the communication between the input port 56a and R-position output port 56c is interrupted, and a state in which the communication between the input port 56a and D-position output port 56b is interrupted and the input port 56a and R-position output port 56c are communicated with each other are switched according to a magnitude of a stroke of the spool 64. The manual plate 62 is provided with a detent mechanism 70 including a plate-like detent spring 74 whose proximal end is locked in the case of the automatic transmission 20 with a bolt, and a roller 76 that is attached to the distal end of the detent spring 74 so that it can freely revolve, and that is abutted with a pressure against a cam surface 72 having ridges and valleys alternatively formed on the edge of the manual plate 62.

The ATECU 29 is configured as a microprocessor having a CPU centered, though it is not shown in detail. The ATECU 29 includes, in addition to the CPU, a ROM in which processing programs are stored, a RAM in which data is temporarily stored, input and output ports, and a communication port. To the ATECU 29, the number of input-shaft rotations Nin sent from a number-of-rotations sensor attached to the input shaft 21, and the number of output-shaft rotations Nout sent from a number-of-rotations sensor attached to the output shaft 22 are inputted via the input port. From the ATECU 29, driving signals for solenoids including the linear solenoids SLT and SLCI are outputted via the output port. The ATECU 29 communicates with the main ECU 90, controls the automatic transmission 20 (hydraulic circuit 50) according to a control signal sent from the main ECU 90, and, if necessary, outputs data concerning the state of the automatic transmission 20 to the main ECU 90.

Figure 5:
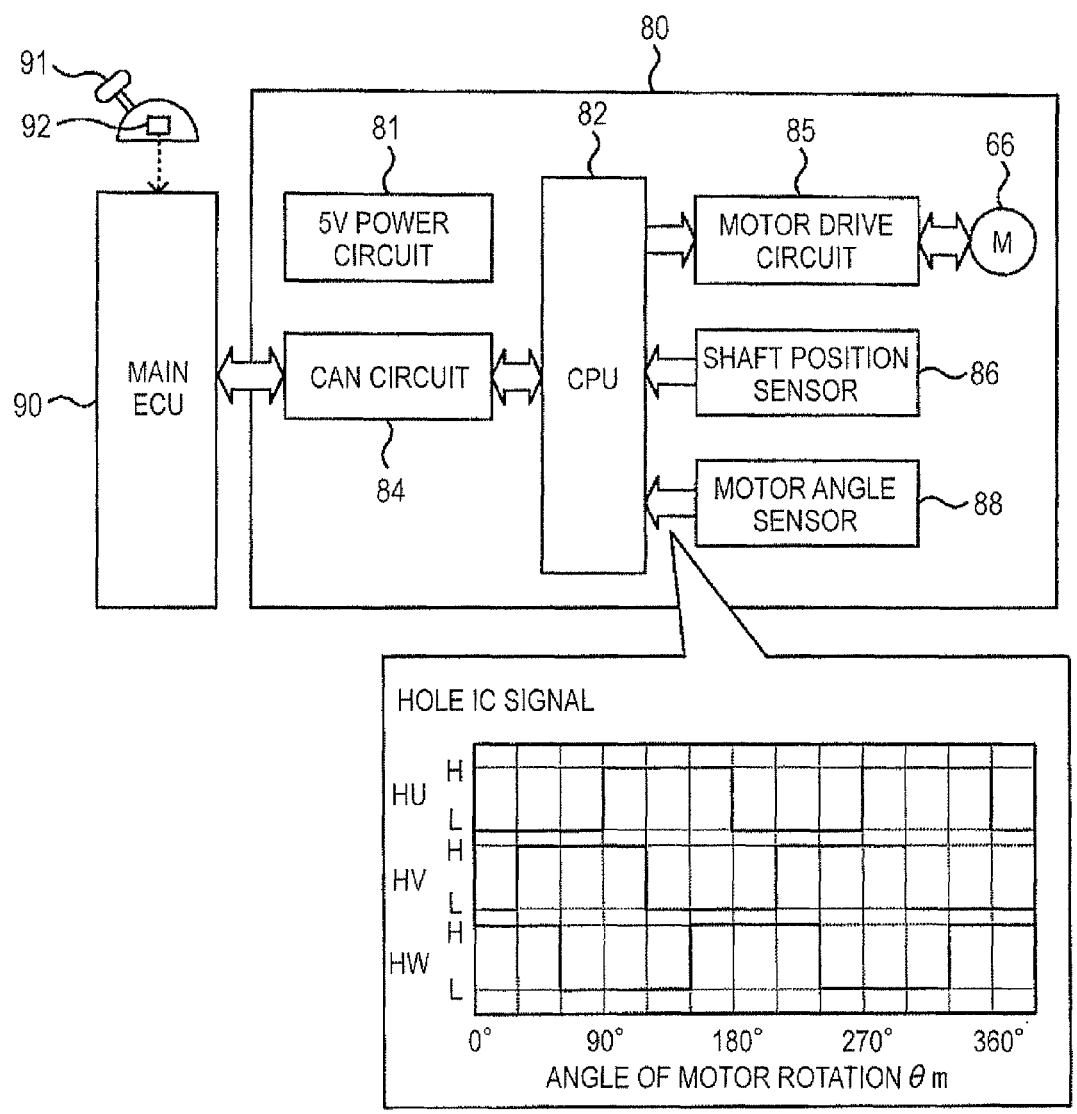
FIG. 5 is a configuration diagram showing the outline of the configuration of an SBWECU.

The SBWECU 80 is, as shown in FIG. 5, configured with a CPU 82, which serves as a central processing circuit, as a center. The SBWECU 80 includes, in addition to the CPU 82, a 5V power circuit 81 that feeds power to components, a CAN circuit 84 that performs CAN communication with the main ECU 90, an electric motor 66 that is a three-phase brushless motor for driving the manual shaft 60 along with rotational driving of the rotation shaft 66a, a drive circuit 85 that drives the electric motor 66, a shaft position sensor 86 that detects an angle of rotation of the manual shaft 60 of the manual valve 56, and a brushless motor control motor angle sensor 88 that detects an angle of rotation of the electric motor 66. The motor angle sensor 88 includes three hole ICs associated with the phases (U phase, V phase, and W phase) of the electric motor 66, and detects the magnetic-pole position of the rotor by detecting output voltages of the hole ICs that are switched in units of an electrical angle of 60°.

The main ECU 90 is configured as a microprocessor having a CPU centered, though it will not be shown in detail. The main ECU 90 includes, in addition to the CPU, a ROM in which processing programs are stored, a RAM in which data is temporarily stored, input and output ports, and a communication port. To the main ECU 90, a shift position SP sent from a shift position sensor 92 that detects the manipulated position of a shift lever 91, an accelerator pedal angle Acc sent from an accelerator pedal position sensor 94 that detects a magnitude of a stroke imposed on an accelerator pedal 93, a brake switch signal BSW sent from a brake switch 96 that detects a stroke imposed on a brake pedal 95, and a vehicle speed V sent from a vehicle speed sensor 98 are inputted via the input port. From the main ECU 90, a lighting signal for an alarm lamp 99 is outputted via the output port. The main ECU 90 is, as mentioned above, connected to the engine ECU 16, ATECU 29, and SBWECU 80 via the communication port, and transfers various control signals and data to or from the engine ECU 16, ATECU 29, and SBWECU 80.

In the thus configured automobile 10 of the embodiment, at the ordinary time, the main ECU 90 transmits a shift command signal consistent with the position of the shift lever 91 to the SBWECU 80 and ATECU 29. The SBWECU 80 having received the shift command signal (shift position SP) uses the drive circuit 85 to drive or control the electric motor 66 on the basis of the shaft position POS sent from the shaft position sensor 86, so that the manual valve 56 will be moved to a valve position associated with the shift position SP. The ATECU 29 having received the shift command signal controls the respective linear solenoids on the basis of the shift position SP, so that the clutches C1 to C3 and brakes B1 and B2 will be brought to ON or OFF. When the shift lever 91 is shifted or manipulated to the drive (D) position, the accelerator pedal angle Acc sent from the accelerator pedal position sensor 94 and the vehicle speed V sent from the vehicle speed sensor 98 are transmitted to the ATECU 29. The ATECU 29 having received the accelerator pedal angle Acc and vehicle speed V uses a shift map to designate any of the first to sixth speeds for advancement on the basis of the accelerator pedal angle Acc and vehicle speed y, and drives or controls the linear solenoids according to the designated speed stage, so that the necessary clutches and brakes out of the clutches C1 to C3 and brakes B1 and 82 will be brought to ON.

Figure 6:
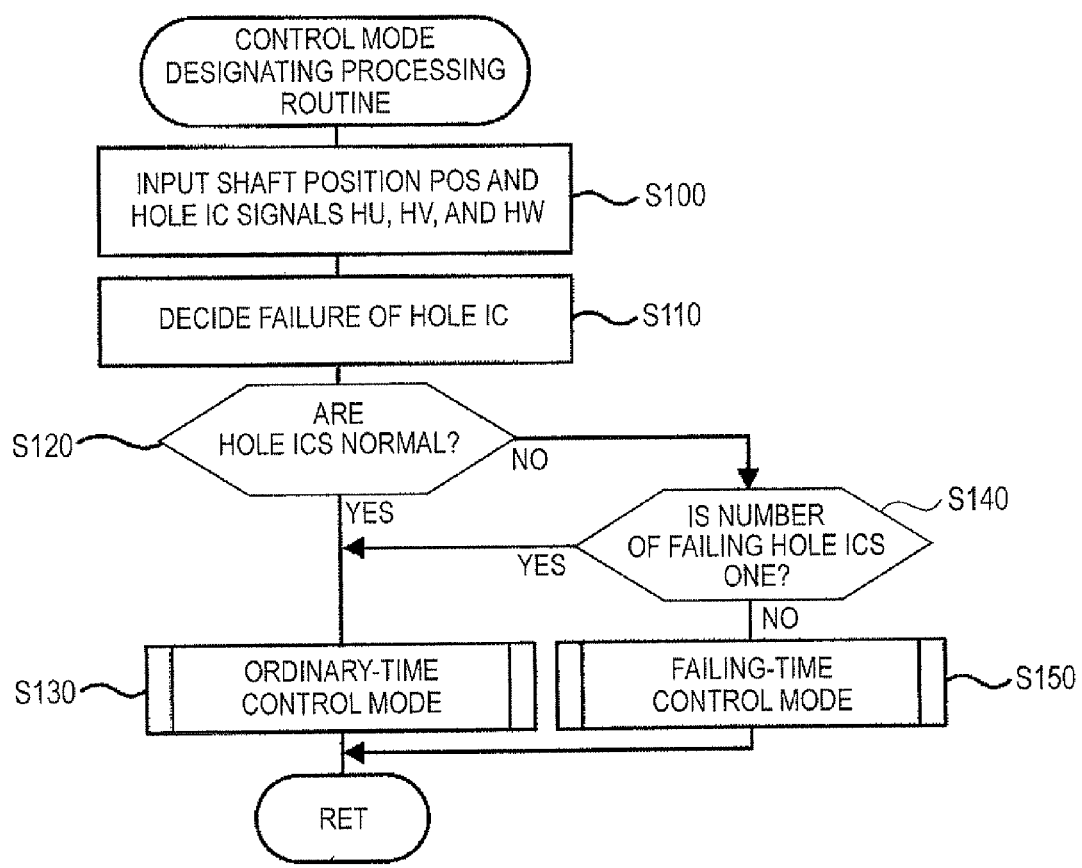
FIG. 6 is a flowchart showing an example of a control mode designating processing routine to be executed by the SBWECU.

Next, a description will be made of the actions of the thus configured automobile 10, or more particularly, the actions of the SBWECU 80 to be made in case of a failure in the motor angle sensor 88. FIG. 6 is a flowchart showing an example of a control mode designating processing routine to be executed by the SBWECU 80. The routine is repeatedly executed at intervals of a predetermined time (for example, several tens of milliseconds).

When the control mode designating processing routine is executed, the CPU 82 of the SBWECU 80 first executes the processing of inputting data items, such as, the shaft position POS sent from the shaft position sensor 86 and the hole IC signals HU, HV, and HW sent from the three hole ICs of the motor angle sensor 88 (step S100).

Thereafter, a failure in a hole IC is decided (step S110). For deciding the failure in a hole IC, for example, the rotating direction of the electric motor 66 is decided by deciding based on a magnitude of a temporal change in the shaft position POS, which is detected by the shaft position sensor 86, whether the rotating direction of the manual shaft 60 is the direction of forward rotation or reverse rotation.

Signals to be detected next by the motor angle sensor 88 are inferred from the rotating direction of the electric motor 66, the hole IC signals detected previously by the motor angle sensor 88, and a signal pattern shown in FIG. 5. The inferred signals are compared with the hole IC signals HU, HV, and HW actually detected this time by the motor angle sensor 88. The comparison is performed for each of the signals HU, HV, and HW, and a failure is decided individually for each of the hole ICs.

If all of the three hole ICs are decided to be normal (step S120), an ordinary-time control mode in which the hole IC signals HU, HV, and HW sent from the motor angle sensor 88 are used to control the electric motor 66 is designated (step S130). If any of the three hole ICs is decided to have failed, whether the number of failing hole ICs is one is decided (step S140). If the number of failing hole ICs is one, the foregoing ordinary-time control mode is designated in order to control the electric motor 66 using the signals of the two normal hole ICs (step S130). If the number of failing hole ICs is two or more, a failing-time control mode in which the electric motor 66 is controlled in a sensor-less manner without use of the hole IC signals HU, HV, and HW sent from the motor angle sensor 88 is designated (step S150). The routine is then terminated.

Figure 7:
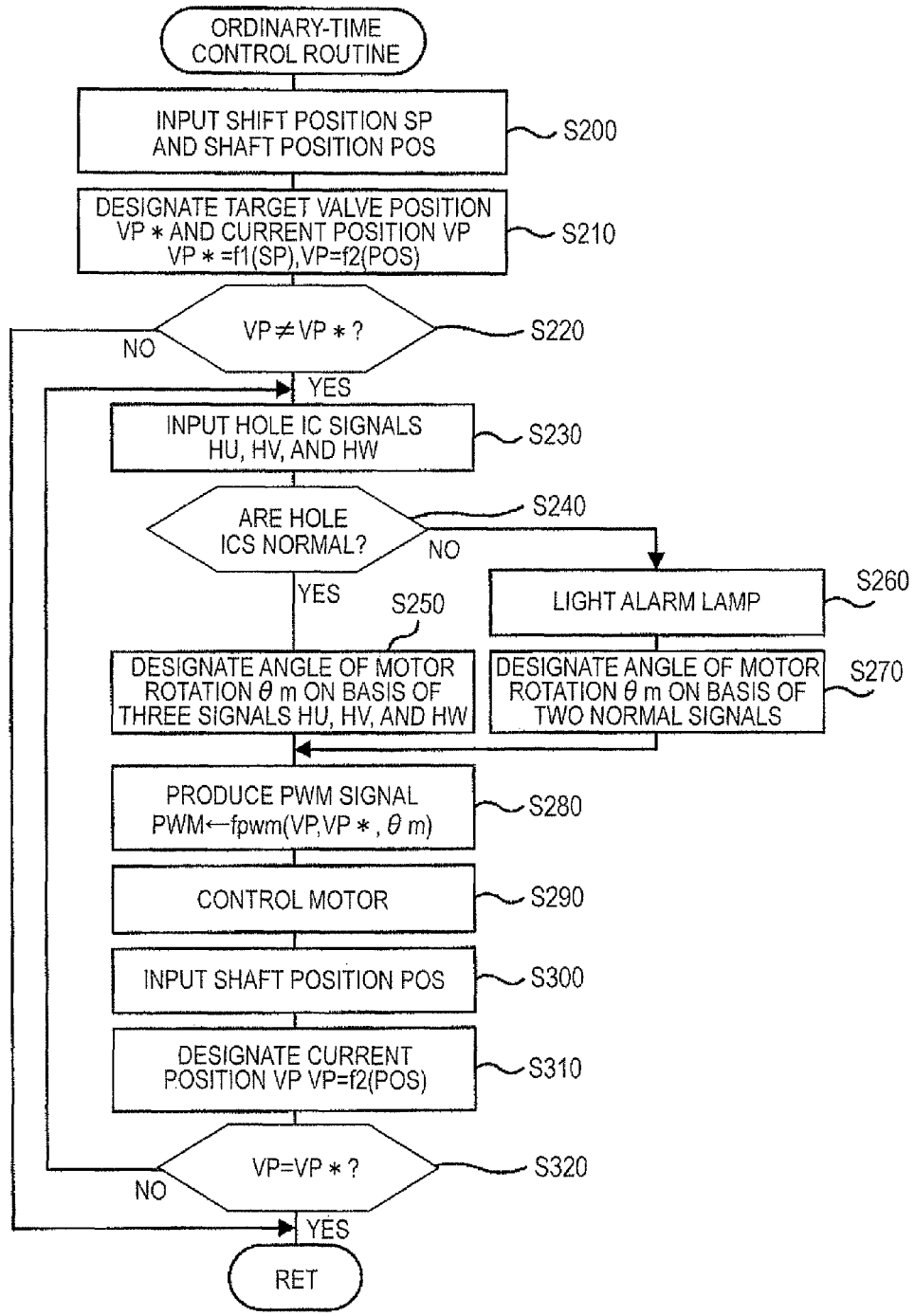
FIG. 7 is a flowchart showing an example of an ordinary-time control routine.
Figure 8:
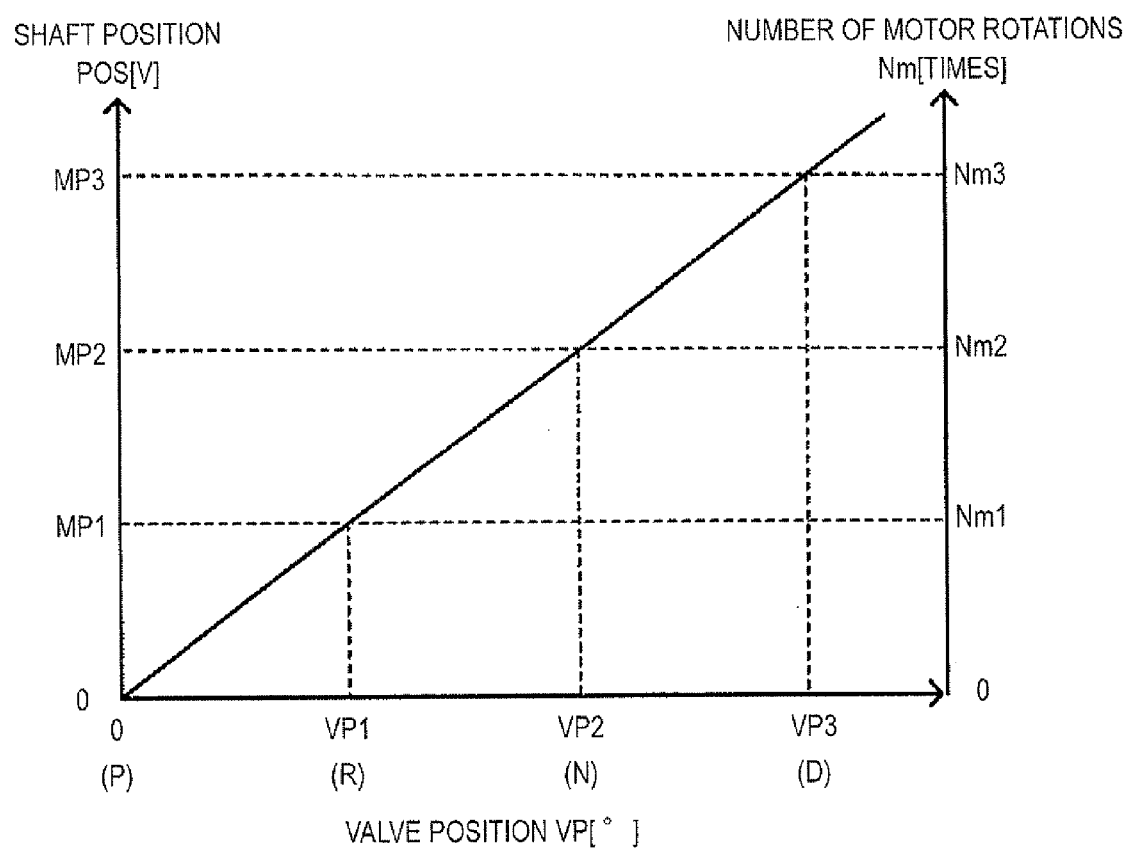
FIG. 8 is an explanatory diagram showing the relationship among a shaft position POS, a valve position, and the number of motor rotations.

Next, actions in the ordinary-time control mode will be described below. FIG. 7 is a flowchart showing an example of an ordinary-time control routine. In the routine, data items such as the shift position SP detected by the shift position sensor 92 and transmitted from the main. ECU 90 through communication, and the shaft position POS sent from the shaft position sensor 86 are inputted (step S200). A target valve position VP* that is a target position of the manual valve 56 is designated based on the inputted shift position SP, and a valve position VP indicating the current position of the manual valve 56 is designated based on the inputted shaft position POS (step S210). The target valve position VP* and current valve position VP are compared with each other (step S220). Herein, as for the valve position VP, the relationship between shaft positions POS and valve positions VP is obtained in advance and stored as a map in the ROM. When the shaft position POS is given, the associated valve position VP is deduced from the map. FIG. 8 shows an example of the map. When the target valve position VP* and current valve position VP square with each other, the manual valve 56 need not be moved. The routine is therefore terminated. When the target valve position VP* and current valve position VP do not square with each other, the hole IC signals HU, HV, and HW are inputted from the motor angle sensor 88 (step S230). If all of the three hold ICs of the motor angle sensor 88 are decided to be normal through the control mode designating processing routine, an angle of motor rotation θm is designated based on the inputted hole IC signals HU, HV, and HW (step S250). A pulse width modulation (PWM) signal for driving the electric motor 66 is produced based on the target valve position VP*, the current valve position VP, and the angle of motor rotation θm (step S280). The produced PWM signal is outputted to the drive circuit 85 in order to drive or control the electric motor 66 (step S290). The shaft position POS is inputted (step S300), and the current valve position VP is designated based on the inputted shaft position POS (step S310). If the target valve position VP* and current valve position VP do not square with each other (step S320), the routine returns to the step S230, and the pieces of processing of steps S230 to S320 are repeated. If the target valve position VP* and current valve position VP square with each other, the routine is terminated.

If any of the three hole ICs of the motor angle sensor 88 is decided to have failed at step S240, a control signal for use in lighting the alarm lamp 99 is transmitted to the main ECU 90 (step S260). The angle of motor rotation θm is designated based on two of the signals fed from the three hole ICs and the shaft position POS sent from the shaft position sensor 86 (step S270). The pieces of processing of step S280 and subsequent steps are then carried out. Since the three hole IC signals HU, HV, and HW are out of phase by an electrical angle of 60°, when the rotating direction of the electric motor 66 is specified based on the magnitude of a temporal change in the shaft position POS, the remaining signal can be inferred from the rotating direction of the electric motor 66, the two hole IC signals, and the cycle of the hole IC signals. Therefore, even if any of the three hole ICs of the motor angle sensor 88 fails, the angle of motor rotation θm can be designated. The electric motor 66 can be controlled based on the angle of motor rotation θm.

Figure 9:
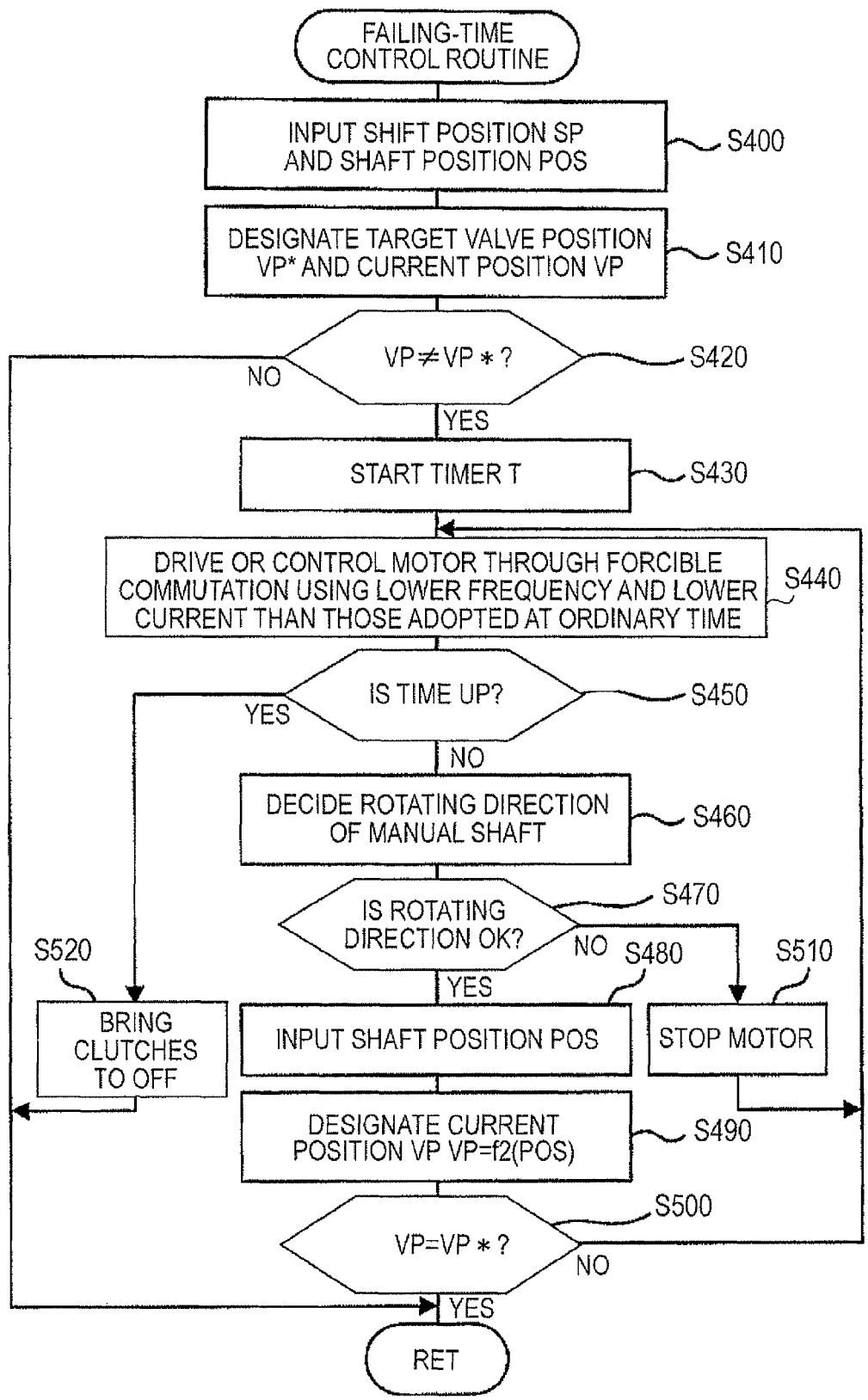
FIG. 9 is a flowchart showing an example of a failing-time control routine.
Figure 10:
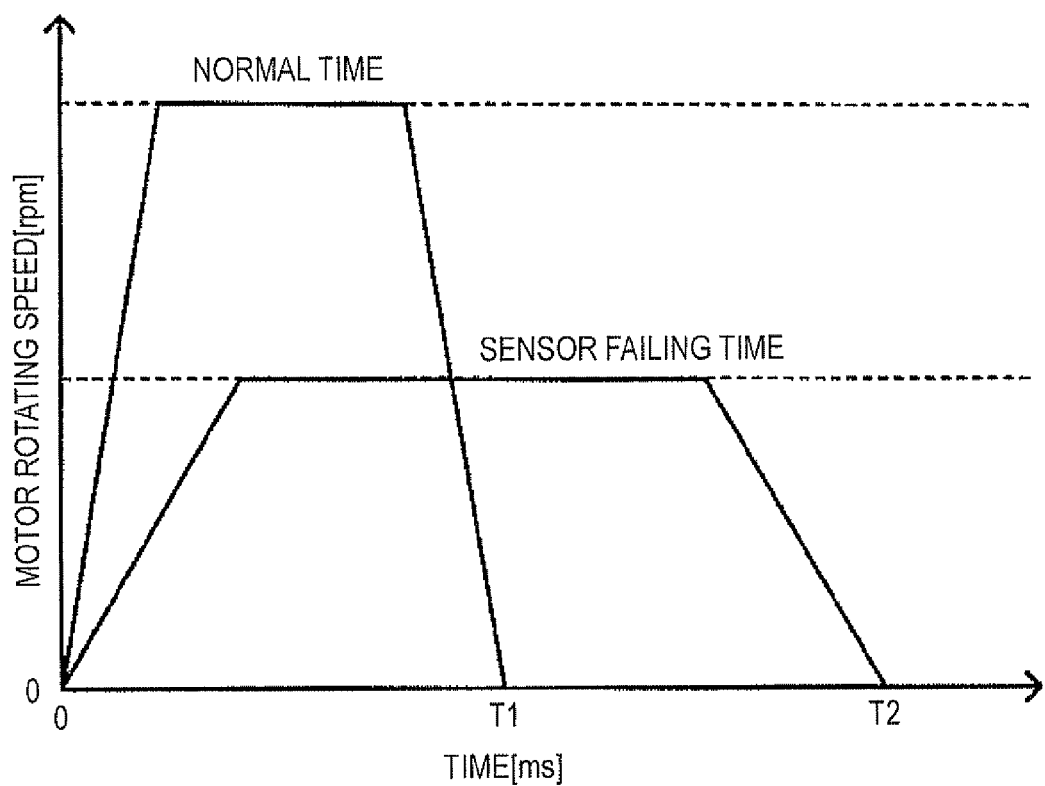
FIG. 10 is an explanatory diagram showing the relationship between the number of motor rotations and a driving time.

Next, actions in the failing-time control mode will be described below. FIG. 9 is a flowchart showing an example of a failing-time control routine. In the routine, data items such as the shift position SP and shaft position POS are inputted (step S400). The target valve position VP* is designated based on the inputted shift position SP, and the current valve position VP is designated based on the inputted shaft position POS (step S410). The target valve position VP* and current valve position VP are compared with each other (step S420). If the target valve position VP* and current valve position VP square with each other, the manual valve 56 need not be moved. The routine is therefore terminated. If the target valve position VP* and current valve position VP do not square with each other, a timer T is started (step S430). Forcible commutation (commutation unrelated to the rotor position of the electric motor 66) is performed to forcibly drive the electric motor 66 in a sensor-less manner (step S440). FIG. 10 shows the relationship between motor rotating speeds and driving times. As illustrated, in the ordinary-time control routine, the electric motor 66 is driven with a high current at a high frequency in order to raise the rotating speed so that the manual valve 56 will be quickly moved to a target position. In the failing-time control routine, the electric motor 66 is driven using a current and a frequency, which are lower than the current and frequency employed at the ordinary time, in order to lower the rotating speed so that the manual valve 56 will be reliably moved to the target position. Whether a predetermined time has elapsed since the timer T is started (whether the time is up) is decided (step S450). If a decision is made that the time is not up, the rotating direction of the manual shaft 60 is, as mentioned above, decided based on the magnitude of a temporal change in the shaft position POS detected by the shaft position sensor 86 (step S460). Whether the decided rotating direction of the manual shaft 60 squares with a direction in which the manual valve 56 approaches to the target valve position VP* is decided (step S470). If the rotating direction squares with the direction, the shaft position POS is inputted (step S480). The current valve position VP is designated based on the inputted shaft position POS (step S490). If the target valve position VP* and current valve position VP do not square with each other (step S500), the routine returns to step S440, and the pieces of processing of steps S440 to S500 are repeated. If the target valve position VP* and current valve position VP square with each other, the routine is terminated.

If it is found at step S470 that the rotating direction of the manual shaft 60 does not square with the direction in which the manual valve 56 approaches to the target valve position VP*, driving the electric motor 66 is suspended (step S510). The routine returns to step S440, and the electric motor 66 is forcibly driven through forcible commutation. When the driving control for the electric motor 66 is not completed within the predetermined time but the time is up (step S450), a control command for bringing the clutches C1 to C3 and brakes 51 and 52 to OFF is transmitted to the ATECU 29 so that the crankshaft 14 of the engine 12 will be disconnected from the axle (step S520). The routine is then terminated.

According to the foregoing shift-by-wire system of the embodiment, whether the motor angle sensor 88 that detects an angle of rotation of the rotation shaft 66a (rotor) of the electric motor 66 which actuates the manual valve 56 has failed is decided. If the motor angle sensor does not fail, the electric motor 66 is controlled based on the angle of motor rotation θm sent from the motor angle sensor 88 so that the manual valve 56 will be moved to a valve position associated with the shift position SP sent from the shift lever 91 (ordinary-time control mode). If the motor angle sensor 88 has failed, the electric motor 66 is forcibly driven through forcible commutation while the rotating direction of the manual shaft 60 (the rotating direction of the electric motor 66) is checked based on the magnitude of a temporal change in the shaft position POS sent from the shaft position sensor, so that the manual valve 56 will be moved to a valve position associated with the shift position SP sent from the shift lever 91 (failing-time control mode). Therefore, even if the motor angle sensor 88 fails, the failure can be appropriately coped with. In the failing-time control mode, compared with the ordinary-time control mode, the electric motor 66 is driven with a lower current at a lower frequency in order to suppress the rotating speed. Therefore, the manual valve 56 can be more reliably moved to a position associated with the shift position SP.

According to the shift-by-wire system of the present embodiment, when one of the three hole ICs of the motor angle sensor 88 has failed, the angle of motor rotation θm is estimated based on the remaining two hole ICs, the rotating direction of the manual shaft 60 (the rotating direction of the electric motor 66), and the cycle of the hole IC signals. The electric motor 66 is controlled based on the estimated angle of motor rotation θm. Therefore, the manual valve 56 can be actuated through the same control as the control implemented at the ordinary time.

Figure 11A:
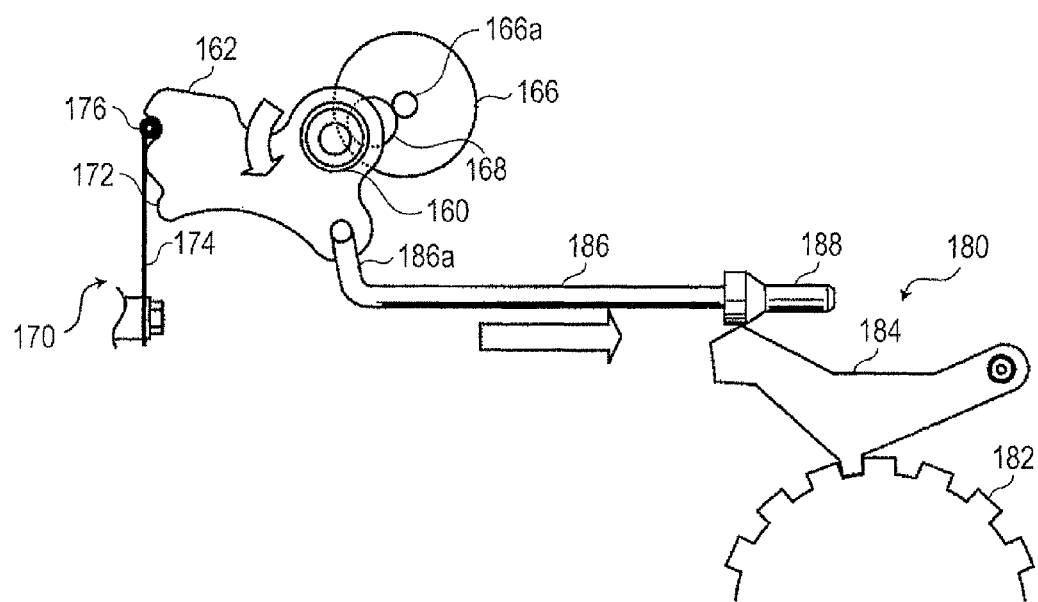
FIGS. 11A and 11B are construction diagrams showing the outline of the construction of a driving system for a parking lock mechanism.
Figure 11B:
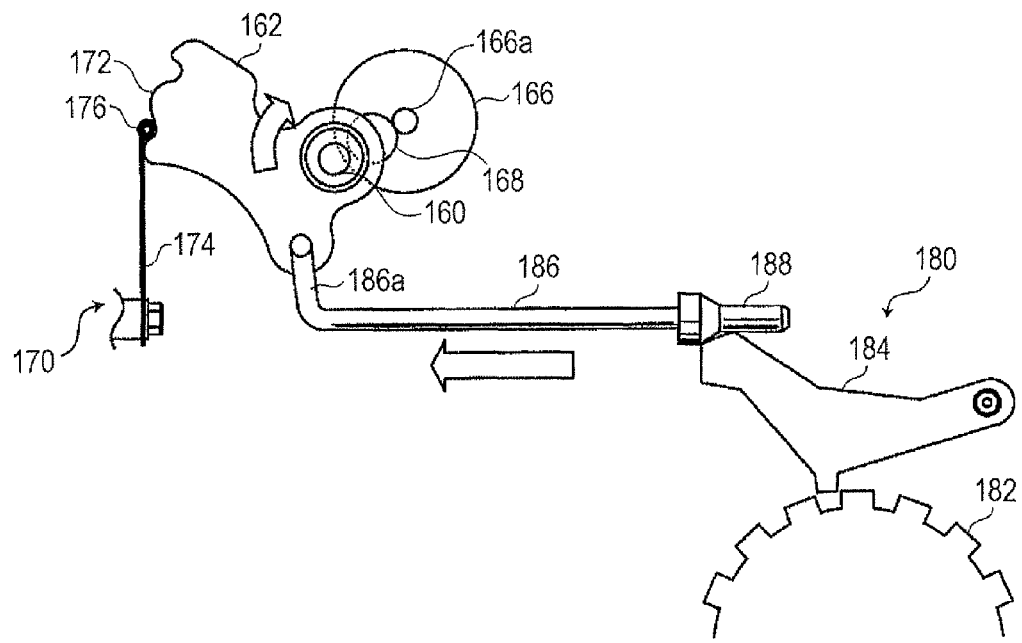

For the shift-by-wire system of the present embodiment, a description has been made by applying the present invention to the processing to be performed in a case where the motor angle sensor 88 of the electric motor 66 which actuates the manual valve 56 has failed. The present invention is not limited to the case. As illustrated in FIGS. 11A and 11B, the present invention may be applied to the processing to be performed in a case where a motor angle sensor of an electric motor 166 that actuates a parking lock mechanism 180 has failed. The parking lock mechanism 180 includes: a parking gear 182 included in the gear mechanism 26 of the automatic transmission 20; a parking pole 184 that is engaged with the parking gear 182 to lock the parking gear with the rotation of the parking gear ceased; a parking rod 186; and a parking cam 188 that is attached to the distal end of the parking rod 186 and that along with the slide of the parking rode 186, presses the parking pole 184 onto the parking gear 182 side or releases the parking pole 184. The proximal end of the parking rod 186 is formed as a hook 186a shaped like letter L. The hook 186a is caught in a hole formed at a position deflected from the axis of rotation of a manual shaft 160 in a manual plate 162. Therefore, when the manual shaft 160 is rotated forward by an electric motor 166, the parking gear 182 is locked (see FIG. 11A). When the manual shaft 160 is rotated reversely, the parking gear 182 is unlocked (see FIG. 11B). The manual plate 162 is, similarly to the embodiment, provided with a detent mechanism 170 including a detent spring 174 and a roller 176 abutted with a pressure against a cam surface 72 formed on the edge of the manual plate 162.

Now, a hybrid automobile in which an engine, a first motor, a planetary gear mechanism that includes three rotating elements to which the crankshaft of the engine, a rotation shaft of the motor MG1, and a driving shaft coupled to the axle are connected, and a second motor connected to the driving shaft are mounted will be discussed. Since the hybrid automobile need not include a hydraulic circuit but can be driven by freely changing gears so as to output power, which is fed from the engine, to the driving shaft, as described above, a shift-by-wire system is thought to be such that: when the shift lever is manipulated into the parking (P) position, the parking lock mechanism 180 is actuated; and when the shift lever is manipulated into a position other than the P position (for example, the drive (D) position or neutral (N) position), the actuation of the parking lock mechanism 180 is canceled. In the shift-by-wire system, the position of the manual plate 162 is switched between only two positions. Therefore, assuming that the electric motor 166 is driven so that the roller 176 will be abutted against a wall formed at a moving end on the cam surface 172 of the detent mechanism 170, a shaft position sensor need not be attached to the manual shaft 160. However, since changing the positions is accompanied by a mechanical impact, when durability is discussed, the manual plate 162 has to be made thick or large in size in order to improve strength. This is disadvantageous to mounting in a vehicle in which preservation of a space is hard to do. If the CPU 102 of the SBWECU 100 fails, the position of the manual shaft 160 remains unknown. The ATECU 29 has to bring all the clutches to OFF so as to realize the neutral (N) position. This disables evacuative driving. In a variant, a shaft position sensor 108 is attached to the manual shaft 160 in order to avoid the foregoing drawback. Therefore, even the variant can be applied to the same pieces of processing as the embodiment can.

In the shift-by-wire system of the present embodiment, when one of the three hole ICs of the motor angle sensor 88 fails, two remaining normal hole ICs are used to estimate the angle of motor rotation θm, and the electric motor 66 is driven or controlled in the ordinary-time control mode. Alternatively, the electric motor 66 may be driven or controlled in a sensor-less manner in the failing-time control mode.

The shift-by-wire system of the present embodiment shall be adapted to a stepped transmission for changing six speed stages. The present invention is not limited to the transmission but may be applied to a stepped transmission for changing plural speed stages ranging from two speed stages to five speed stages, or a stepped transmission for changing seven or more speed stages.

In the shift-by-wire system of the embodiment, the main ECU 90 and ATECU 29 are realized with two electronic control units. Alternatively, the main ECU 90 and ATECU 29 may be realized with three or more electronic control units, or may be realized with a single electronic control unit.

The shift-by-wire system of the embodiment shall be adapted to the automobile 10 in which the engine 12 is mounted as an internal combustion engine. Alternatively, the shift-by-wire system of the embodiment may be adapted to a hybrid vehicle including both the internal combustion engine and an electric motor, or may be adapted to an electric automobile in which only an electric motor for driving is mounted.

Now, a description will be made of the relationship of correspondence between the major components of the embodiment with the major components of the present invention described in Disclosure of the Invention. In the embodiment, the electric motor 66 serving as a brushless motor is equivalent to an "electric motor." An angle-of-motor rotation sensor 114 that detects an angle of rotation of the rotation shaft 66a of the electric motor 66 is equivalent to an "angle-of-rotation sensor." The shaft position sensor 86 is equivalent to a "shaft position sensor." The SBWECU 80 is equivalent to a "control unit." The "electric motor" is not limited to the brushless motor, but may be a synchronous electric motor such as a DC brushless motor or a switched reluctance (SR) motor, or any other electric motor as long as the electric motor is of a type that detects the rotational position of the rotation shaft and implements control using the detected rotational position. The relationship of correspondence between the major components of the embodiment and the major components of the invention set forth in Disclosure of the Invention shall not restrict the components of the invention set forth in Disclosure of the Invention, because the embodiment is an example for use in concretely explaining the best mode for carrying out the invention described in Disclosure of the Invention. Namely, the invention described in Disclosure of the Invention should be interpreted based on the description in Disclosure of the Invention. The embodiment is a mere concrete example of the invention described in Disclosure of the Invention.

The best mode for carrying out the invention has been described using the embodiment. The present invention is not limited to the embodiment but may be implemented in various forms within the scope of the invention without a departure from the gist thereof.

The present invention can be utilized in the automobile industry.

What is claimed is:

1. A shift-by-wire system that is mounted in a vehicle and actuates an object of actuation by driving a manual shaft on the basis of a shifting manipulation, comprising:
   an electric motor that includes a rotation shaft and rotates or drives the manual shaft by rotating or driving the rotation shaft;
   an angle-of-rotation sensor that detects an angle of rotation of the rotation shaft so as to control the electric motor;
   a shaft position sensor that detects the rotational position of the manual shaft; and
   a control unit that at an ordinary time at which the angle-of-rotation sensor functions normally, implements ordinary-time control to control the electric motor on the basis of the angle of rotation of the rotation shaft, which is sent from the angle-of-rotation sensor, so that the rotational position of the shaft sent from the shift position sensor will square with a target rotational position within a predetermined range, and that at an unordinary time at which the angle-of-rotation sensor does not normally function, implements unordinary-time control to initiate sensor-less control for controlling the electric motor while estimating the rotating direction of the rotation shaft of the electric motor on the basis of the rotational position of the shaft sent from the shift position sensor, and to cease the sensor-less control when the rotational position sent from the shift position sensor squares with the target rotational position within the predetermined range.

2. The shift-by-wire system according to claim 1, wherein:
   the electric motor is a three-phase synchronous motor;
   the angle-of-rotation sensor includes three elements associated with the phases for the purpose of detecting the angle of rotation of a rotor of the electric motor; and
   the control unit is such a mechanism that: when an abnormality occurs in the angle-of-rotation sensor, if the abnormality involves only one of the three elements, recognizes the ordinary time, estimates the rotating direction of the electric motor on the basis of the rotational position of the shaft sent from the shaft position sensor, and implements the ordinary-time control on the basis of the estimated rotating direction and the signals sent from the other two normal elements; and if the abnormality involves two or more of the three elements, recognizes the unordinary time and implements the unordinary-time control.

3. The shift-by-wire system according to claim 1, wherein the control unit is such a mechanism that at the unordinary time, compared with the ordinary time, controls the electric motor so that the rotational position of the shaft will be shifted to the target rotational position at a lower rotating speed.

4. The shift-by-wire system according to claim 1, wherein:
   the vehicle has an automatic transmission, which includes clutches that convey power fed from a power plant to an axle, mounted therein; and
   the control unit is such a mechanism that when a predetermined time has elapsed since initiation of the unordinary-time control, ceases the control of the electric motor, and controls the clutches so that the power plant will be disconnected from the axle.

5. The shift-by-wire system according to claim 1, wherein:
   the vehicle has an automatic transmission, which includes clutches to be actuated with a fluid pressure fed via a manual valve interlocked with a manual shaft, mounted therein; and
   the object of actuation is the manual valve.

6. The shift-by-wire system according to claim 1, wherein the object of actuation is a parking lock mechanism to be actuated along with driving of the manual shaft.

* * * * *